Patented Aug. 14, 1945

2,382,803

UNITED STATES PATENT OFFICE 2,382,803

REACTION PRODUCTS OF DIENES AND PROCESS OF PRODUCING SAME

Alexander A. Miller, Stamford, Conn., and Theodore F. Bradley, Edgewood, Md., assignors to American Cyanamid Company, New York, N. Y., a corporation of Maine No Drawing. Original application March 24, 1943, Serial No. 480,332. Divided and this application July 29, 1944, Serial No. 547,292

2 Claims. (Cl. 260—464)

This invention relates to a new series of synthetically prepared monomeric compounds, especially those obtained by reacting a compound containing one or more conjugated double bonds with an acrylic compound. More particularly, it embraces such compounds as alloocimene-acrylonitrile addition products, myrcene-acrylonitrile addition products and similar adducts of diene-acrylic compounds and the processes for preparing such compounds.

It is an object of this invention to prepare these diene reaction products from relatively inexpensive and readily available raw materials.

It is a further object to prepare such products to serve as valuable intermediates suitable for use in the preparation of coating compositions, metallic driers, plasticizers, and the like.

Still another object is to provide a process for the reaction of trienes such as alloocimene, myrcene and the like with vinyl compounds such as acrylonitrile.

These and other objects are attained by reacting the particular diene compounds with acrylonitrile by heating equimolecular mixtures thereof under such conditions as those described in the accompanying examples forming a part of this invention.

The resultant compounds prepared as described below serve as intermediates for the production of a number of useful industrial compounds. The monomeric products of this invention as well as some of the polymeric compounds obtained therefrom have a wide field of application such, for example, as modifiers for plastics, plasticizers for natural and synthetic rubber, adhesives and the like. When incorporated in such solvents as, for example, xylene, toluene, ketones, ethyl dichloride and the like, useful and valuable coating compositions are obtained.

The nitriles, amines, alcohols, acids and esters of the above diene-acrylonitrile adducts also have a wide variety of commercial applications. For example, the nitriles and amines are useful insecticides and insect repellents. In particular, such derivatives as 5,5-dimethyl-2-(α-methyl propenyl)-3-cyclohexene-1-carbonitrile has been found to be an especially effective mosquito repellent. The amines also find use as surface active agents. The metallic salts of the acids are useful driers for coating compositions. The esters are valuable plasticizers for gums, resins, natural and synthetic rubber and the like.

Thus it may be seen that these diene adducts serve as very useful chemical intermediates and find application for various and sundry industrial purposes, particularly when prepared in accordance with the following detailed descriptive examples which illustrate specific embodiments of the invention.

In the following examples, the proportions are given in parts by weight, the examples themselves being illustrative and not limitative of the invention.

EXAMPLE 1

REACTION MONOMER OF ALLOOCIMENE AND ACRYLONITRILE

| | |
|---|---|
| Alloocimene | 1105 g. (ca. 8 mols) |
| Acrylonitrile | 424 g. (ca. 8 mols) |
| Hydroquinone | 1.5 g. (ca. .1%) |

The reaction is probably indicated as follows:

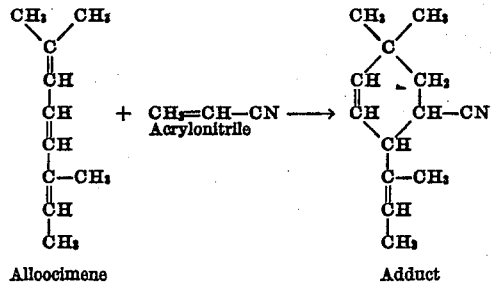

This mixture in the form of a solution is heated on an oil bath to 90° C. at which temperature it refluxes. After refluxing for 60 hours, the temperature will be found to have risen to 135° C. This indicates that most of the low boiling component, acrylonitrile, has been removed either by reaction with the alloocimene or else by volatilization from the reaction mixture. The decrease in weight of 97 g. is accounted for by the distillation of acrylonitrile. The desired product, namely the alloocimene-acrylonitrile adduct, is obtained in a yield of 58.5%, 9% of which is the polymer. The desired product is readily separated from the solution by fractional distillation at 115°–120° C. under a pressure of 1 mm. of mercury.

The probable structural formula of the alloocimene-acrylonitrile adduct is:

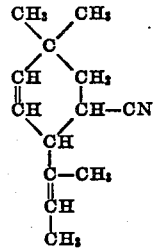

Name: 5,5-dimethyl-2-(-methylpropenyl)-3-cyclohexene-1-carbonitrile
Molecular weight=189
Boiling range=115°–120° C./1 mm.
$n_D^{25} = 1.4948$
$d_{25}^{25} = 0.9107$

EXAMPLES 2 TO 5

Monomeric Reaction Product of Alloocimene and Acrylonitrile Under Super-Atmospheric Pressure Conditions In order to decrease the time of reaction between alloocimene and acrylonitrile, the reaction is preferably carried out in an autoclave at higher temperatures than those given in Example 1 and at super-atmospheric pressure. In order to minimize oxidation and polymerization, 0.1% hydroquinone is added. The following table gives a series of runs made at different temperatures and extending over different time intervals in order to obtain optimum conditions for a maximum yield of product with a minimum of polymer formation. In each of the examples given below, equimolar reacting portions of alloocimene and acrylonitrile are heated with .1 to 1% of hydroquinone in an autoclave. Fractionation of the resultant product at 1 mm. mercury pressure, eliminating the first fraction boiling below 100° C. as consisting principally of unreacted material, gives the following results in each example:

Table

| Example No. | Temp. °C. | Autoclave reaction of alloocimene with acrylonitrile product | | | | | |
|---|---|---|---|---|---|---|---|
| | | Time, hrs. | B. P. at 1 mm. | $n_D^{25}$ | Percent yield | Percent polymer | Percent unreacted |
| 2 | 150 | 6 | 110–115 | 1.4965 | 44.5 | 10.8 | 44 |
| 3 | 150 | 12 | 105–115 | 1.4960 | 60.7 | 12.0 | 27.2 |
| 4[2] | 175 | 12 | [1]112–118 | 1.4960 | 67.0 | 16.0 | 17 |
| 5 | 150 | 18 | 110–120 | 1.4975 | 55.5 | 22.0 | 22.0 |

[1] Constant vapor temperature.
[2] Product dark yellow in color, indicating temperature of 175° C. was too high.

Summarizing the results obtained from the table, it is seen that heating the reactants at 150° C. for 12 hours as in Example 3 results in a preferred yield of the alloocimene-acrylonitrile reaction product.

EXAMPLE 6

Monomeric Reaction Product of Myrcene and Acrylonitrile

| | |
|---|---|
| Myrcene | 272 g. (2 mols) |
| Acrylonitrile | 106 g. (2 mols) |
| Hydroquinone | .3 g. (.1%) |

The reaction is probably indicated as follows:

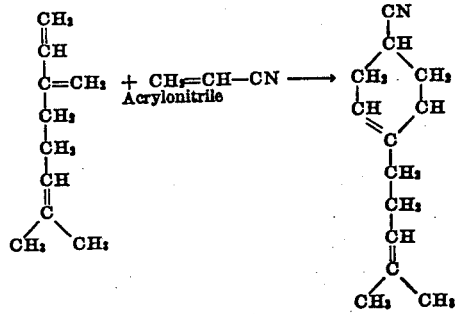

Myrcene           Adduct

This mixture is refluxed at first at a temperature of 90° C. After refluxing for a period of four hours it is found that the temperature rises gradually to 120° C., while the rate of refluxing decreases with the increasing viscosity of the solution. The resultant product is then fractionally distilled under a pressure of 1 mm. of mercury, the unreacted myrcene and acrylonitrile being stripped off at vapor temperatures up to 80° C. The myrcene-acrylonitrile reaction, however, gives a much higher proportion of undesirable polymer. Thus in the above run 40% of the polymeric and 46% of the monomeric addition product was obtained, while 13% of the myrcene-acrylonitrile solution remained unreacted. The fraction boiling at 100° C. to 123° C./1 mm. pressure yields the desired product, a myrcene-acrylonitrile adduct, the major portion of which distills over rapidly at 119°–120° C./1 mm. pressure.

The probable formula of this reaction product is:

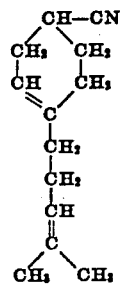

Name 4-(γ-isohexenyl)-3-cyclohexene-1-carbonitrile
Molecular weight=189
Boiling range=115°–120° C./1 mm.
$n_D^{25}=1.4895$
$d_{25}^{25}=0.9191$

EXAMPLE 7

Hydrogenation of Product of Example 1

A sample of the alloocimene-acrylonitrile addition product of Example 1 is readily hydrogenated under super-atmospheric pressure with the aid of Raney nickel as a catalyst. The product possessing a strongly ammoniacal odor is readily separated by filtration from the catalyst to yield a colorless liquid which upon standing exposed to the air becomes reddish-brown in color. The filtrate is fractionally distilled and the portions boiling at 98° to 100° C./1 mm. pressure comprise 80% of the total filtrate and make up the desired primary amine having the probable structural formula:

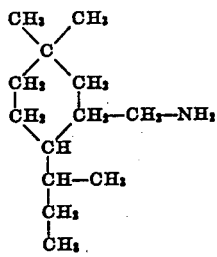

Name: 3,3-dimethyl-6-(sec. butyl)-1-cyclohexanemethylamine
Molecular weight =197
Boiling range=98°–100° C./1 mm.
$n_D^{25}=1.4897$
$d_{25}^{25}=0.8848$ The undesired non-volatile residue comprising the remaining 20% is a secondary amine forming no part of the subject matter of the present application.

EXAMPLE 8

Hydrogenation of the Product of Example 6

The myrcene-acrylonitrile addition product of Example 6 is readily hydrogenated as above described in Example 7 and yields a product which upon distillation under a pressure of 1 mm. of mercury yields a primary amine having a boiling point range of 115°–120° C./1 mm. pressure at which temperature 84% of the desired product in the form of a primary amine distills over. This primary amine has the following probable formula:

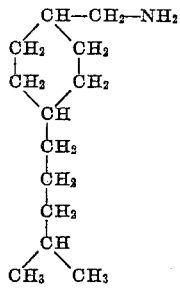

Name: 4-isohexyl-1-cyclohexanemethylamine
Molecular weight=197
Boiling range=115°–120° C./1 mm.
$n_D^{25}=1.4942$
$d_{25}^{25}=0.8941$
Neutral equivalent 190 (theory 197).

A number of other monomeric materials which may be subsequently polymerized, or even used as the monomers, may likewise be obtained by reacting alloocimene, beta-myrcene, etc., with such products as dichloroacrylonitrile, dibromoacrylonitrile, methyl methacrylate, and the like. Such compounds as the above may be used to form copolymers with products such as butadiene, isoprene, pentadiene, dimethyl butadiene, chlorobutadienes, and the like. Furthermore, the compounds of this invention either in monomeric or in polymeric form may be dissolved in any one of a number of suitable solvents for use in coating compositions, such solvents including toluene, xylene, the ketones, ethyl dichloride, etc. Such coating compositions may have added thereto natural or synthetic drying oils as well as such resinous materials as any one of a number of phenol-formaldehyde condensation resins, more particularly such oil-soluble substituted phenol-formaldehyde condensation products as p-tert.-amyl-phenol formaldehyde condensates. In addition various other resins such as the aminotriazine-formaldehyde condensation products, polyalcohol-polycarboxylic acid resins either modified with a fatty oil acid, ester gum, coumarone-indene resin, or in unmodified form may likewise be used to form coating compositions.

A compatible dye or various pigments may be incorporated in these coating compositions, examples being titanium dioxide, zinc oxide, iron oxide, malachite green, toluidine red, ochre, carbon black, etc. If desirable, fillers, extenders and the like may also be included such as wood flour, clay, glass wool, granite dust, sand, etc.

The above examples illustrate clearly that the use of more intensive reaction means such as may be effected with the aid of autoclaves, high pressures, inert gas media, and the like, result in higher yields of desired adduct products. Likewise utilizing such intensive reactions facilitates the reaction of conjugated fatty acids and their esters as well as other more readily available dienes with corresponding acrylic compounds.

The resultant monomers are suitable for a wide variety of purposes, particularly in the field of plastics and in the field of coating compositions. The products are useful ingredients for paper coating, textile coating or for coating other fibrous materials such as leather, as well as for impregnating and facilitating the penetration of various resinous materials into and between the fibers of similar fibrous materials. The heavy metal salts of acrylic acid-alloocimene addition products can be readily prepared by precipitation of such salts from an aqueous solution of a neutral potassium salt of the adduct product by such ions as $Pb^{++}$, $Mn^{++}$, $Co^{++}$, $Cu^{++}$, etc. The lead, manganous, and cobalt salts have properties similar to the corresponding naphthenates and hence may be incorporated in driers for coating compositions.

The compounds of this invention may be used as plasticizers for adhesives, particularly for such tacky materials as natural and synthetic rubber in adhesive mixtures.

This application is a division of our application Serial No. 480,332, filed March 24, 1943.

Many modifications and variations of the process and compounds described herein above may be made without departing from the spirit and scope of the invention as defined in the appended claims.

We claim:

1. A compound having the following probable formula:

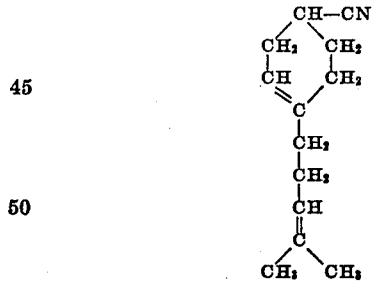

being the reaction product of equimolecular proportions of myrcene and acrylonitrile.

2. The process which comprises reacting equimolecular proportions of myrcene and acrylonitrile by heating them together at a temperature of at least 90° C.

ALEXANDER A. MILLER.
THEODORE F. BRADLEY.